Dec. 8, 1925.                                                        1,564,248
C. KNOWLES
GEAR CUTTER GRINDING MACHINE
Filed June 20, 1921                      7 Sheets-Sheet 1

Inventor
Carroll Knowles
By Joseph K. Schofield
Attorney.

Dec. 8, 1925.

C. KNOWLES

GEAR CUTTER GRINDING MACHINE

Filed June 20, 1921 7 Sheets-Sheet 6

1,564,248

Inventor.
Carroll Knowles
By Joseph K. Schofield
Attorney.

Dec. 8, 1925.
C. KNOWLES
GEAR CUTTER GRINDING MACHINE
Filed June 20, 1921  7 Sheets-Sheet 7
1,564,248
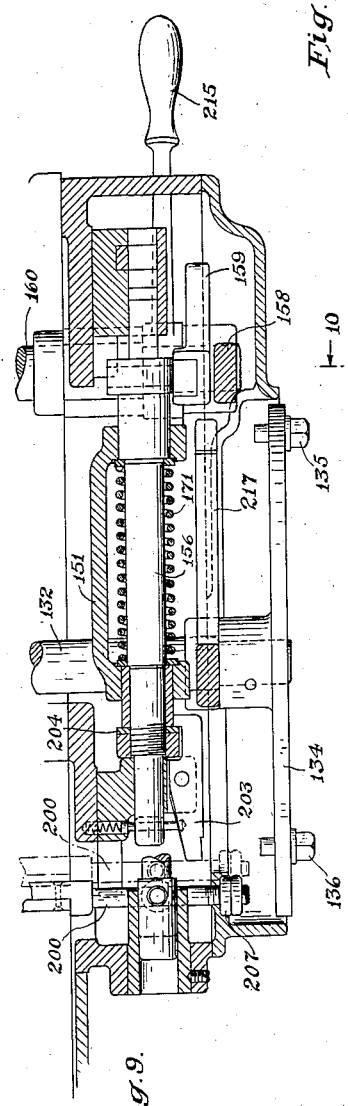
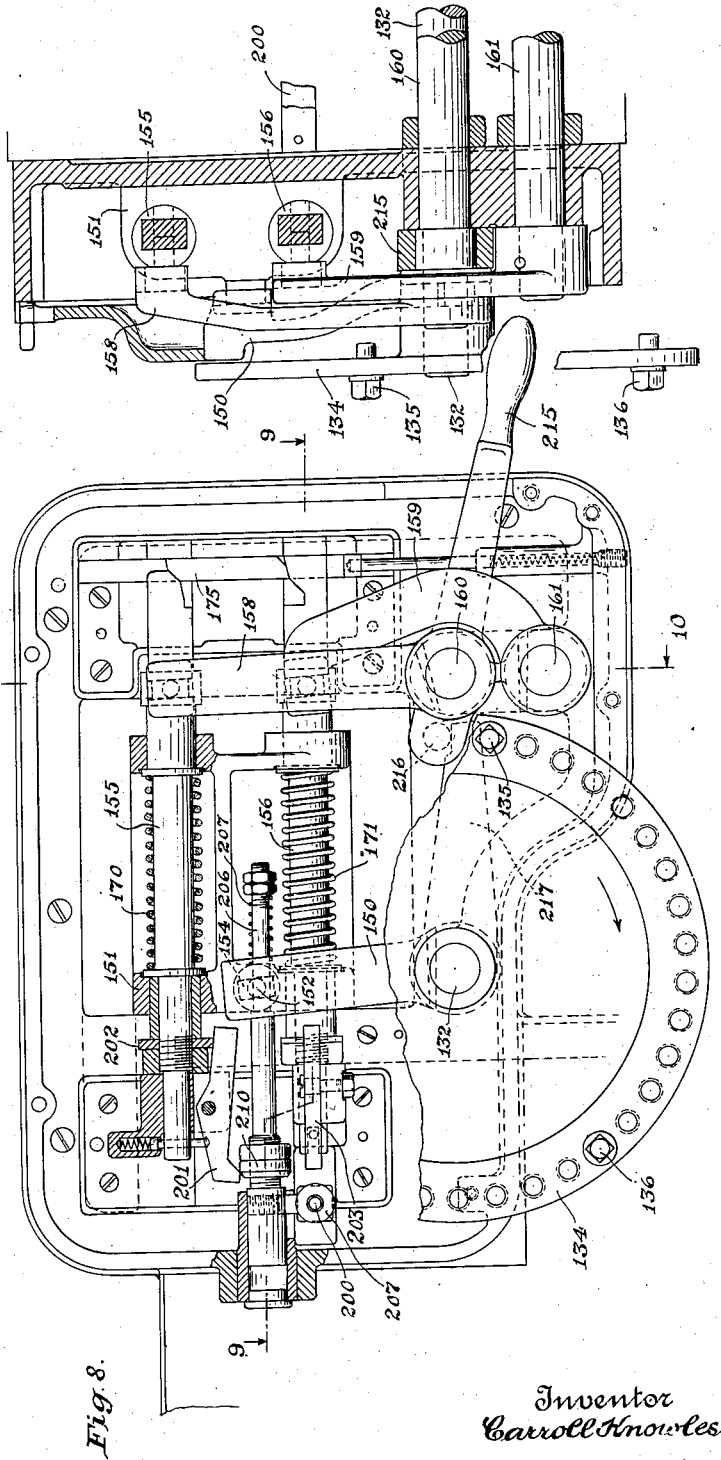
Inventor
Carroll Knowles
By Joseph K. Schofield
Attorney.

Patented Dec. 8, 1925.

1,564,248

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

GEAR-CUTTER GRINDING MACHINE.

Application filed June 20, 1921. Serial No. 479,029.

*To all whom it may concern:*

Be it known that I, CARROLL KNOWLES, a citizen of the United States, residing at Hartford, in the county of Hartford and State of Connecticut, have invented certain new and useful Improvements in Gear-Cutter Grinding Machines, of which the following is a specification.

This invention relates to grinding machines and in particular to a grinding machine for grinding the cutting surfaces of a gear cutter, or other form of cutter, having a plurality of teeth of rack form.

It is an object of the present invention to provide a machine of the above type that will accurately grind the cutting surfaces of a gear cutter so that these cutting surfaces will be formed at precisely equal distances from each other along one side of the cutter and at identical oblique angles to each other.

One of the features of my invention that is advantageous is that the cutter may be moved periodically with the table on which it is mounted a predetermined but variable distance past a pair of grinding wheels so that opposite sides of flanks of the rack formed teeth on the cutter may be ground simultaneously, after which the cutter can again be moved to position an adjacent tooth in front of the wheels, and opposite sides or flanks of the other teeth successively ground. Between movements of the table on which the cutter is mounted, the grinding or cutting wheels move forward to engage the cutter and then rearwardly to disengage the cutter.

Another object of the invention is to alternately advance the table and cutter being ground predetermined distances and then grind the opposite flanks of alternate teeth and repeat this alternate indexing and cutting operation a plurality of times until all the teeth have been ground, after which the table may be returned to its original position either automatically or by hand.

Another important object of the invention is to provide a grinding machine to grind the cutting surfaces of a rack formed cutter in the manner above described with a high degree of precision, also, to provide a machine for grinding cutters of different sizes, number of teeth, and different tooth spacings, provision being made for changing the adjustment of the grinding wheels, the indexing of the table, and the number of times the table is indexed before it is returned to its initial position.

A further object of the invention is to provide mechanism in the machine above described to feed the cutter being ground toward the grinding wheels a predetermined small distance after each passage of the cutter past the wheels.

Another object is to provide means acting automatically to index the table, return it to its initial position after a plurality of indexing movements, feed the cutter relative to the grinding wheels, and also to periodically advance and withdraw the grinding wheels from the cutter along oblique lines parallel respectively to the flanks of the cutter in timed relation to the movements of the cutter and table.

Further, it is an object of the invention to provide mechanism to accomplish the functions referred to above positively, accurately, and quickly in a machine which is simple, rigid, and automatic in its action.

With these and other objects in view my invention consists in the features of construction and operation set forth in the following specification and illustrated in the accompanying drawings.

In the accompanying drawings annexed hereto and forming a part of this specification, I have shown my invention embodied in a grinding machine for a cutter of rack tooth form, but it will be understood that the invention can be otherwise embodied and that the drawings are not to be construed as defining or limiting the scope of the invention, the claims appended to this specification being relied upon for that purpose.

In the drawings:

Fig. 8 shows an elevation in section of the mechanism controlling the stopping and returning of the table.

Fig. 9 shows a sectional view of the same mechanism taken on line 9—9 of Fig. 8.

Fig. 10 shows a sectional view of the same mechanism taken on line 10—10 of Fig. 8.

Briefly, my invention in its broadest aspect comprises the following principal parts: first, a base; second, a table slidably mounted thereon; third, actuating means to periodically move said table predetermined distances along said base; fourth, cutting tools rotatably mounted adjacent said table; fifth, means to advance and return said cutting tools relative to said table along lines oblique to the direction of movement of the table; sixth, a support for a cutter to be ground adjustably mounted on said table, and seventh, means to feed the cutter toward the grinding or cutting wheels.

Figure 2:
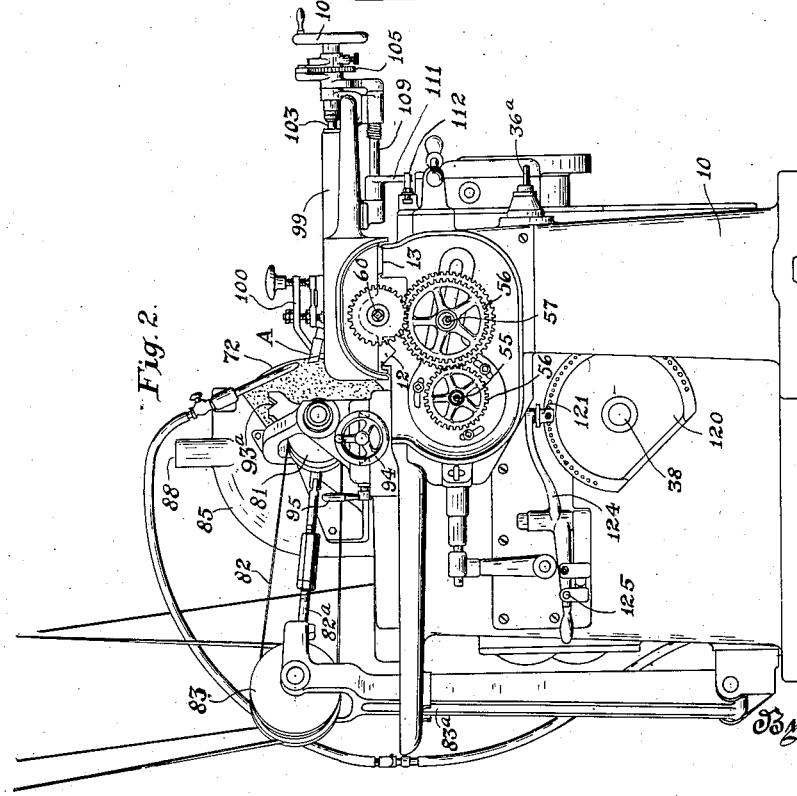
Fig. 2 shows an end view of the same, one of the cover plates being removed to more clearly show parts of the construction.

Referring more particularly to the figures of the drawings, the base of the machine is shown at 10 on which a table 11 carrying the cutter A to be ground is adapted to slide in a horizontal plane, suitable guideways being formed on the upper surface of the base 10. As shown in Fig. 2, these guideways are in the form of a V 12 and a flat surface 13.

Figure 6:
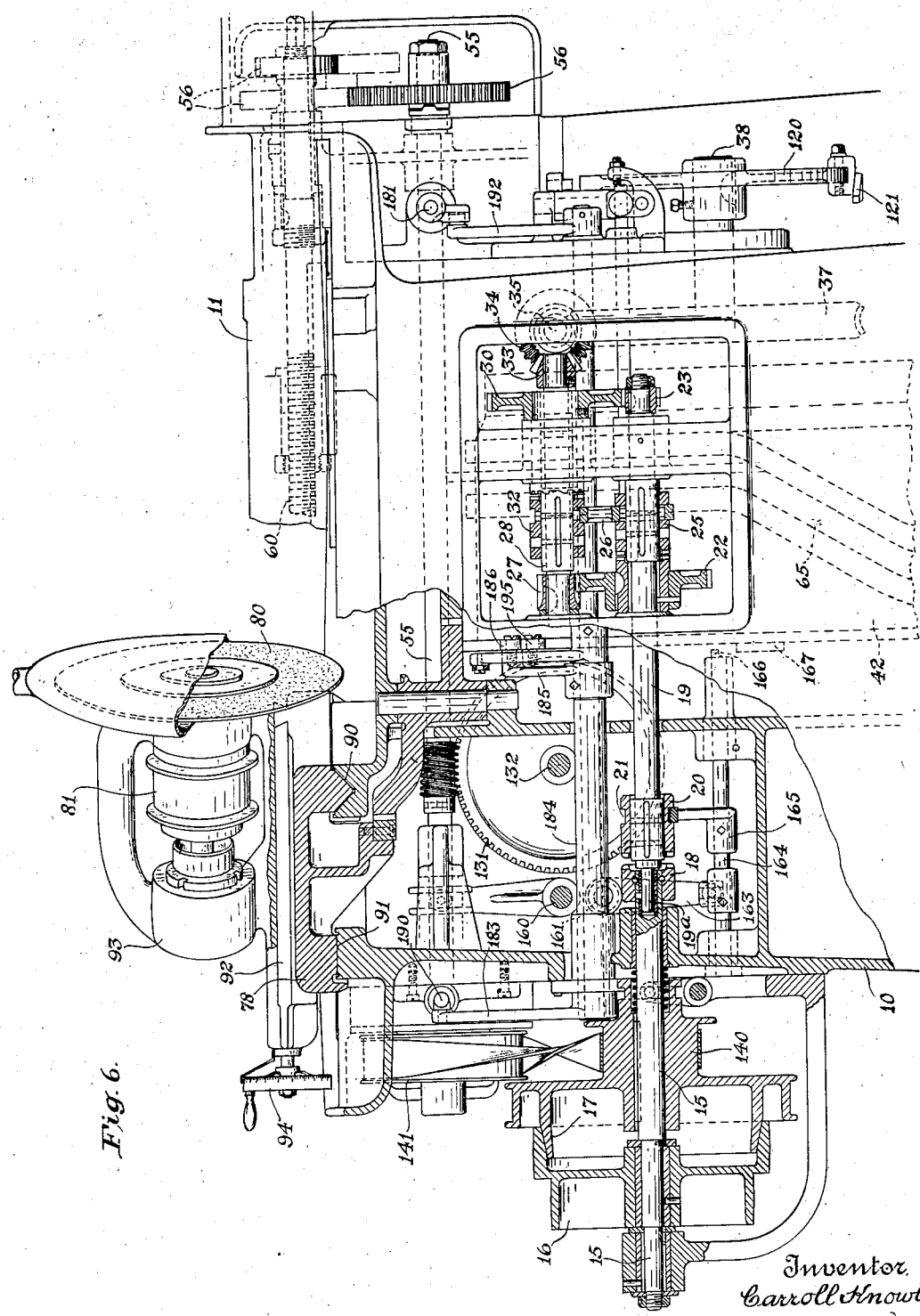
Fig. 6 shows a rear elevation, parts being broken away to more clearly show the driving mechanisms.
Figures 7, 7A:
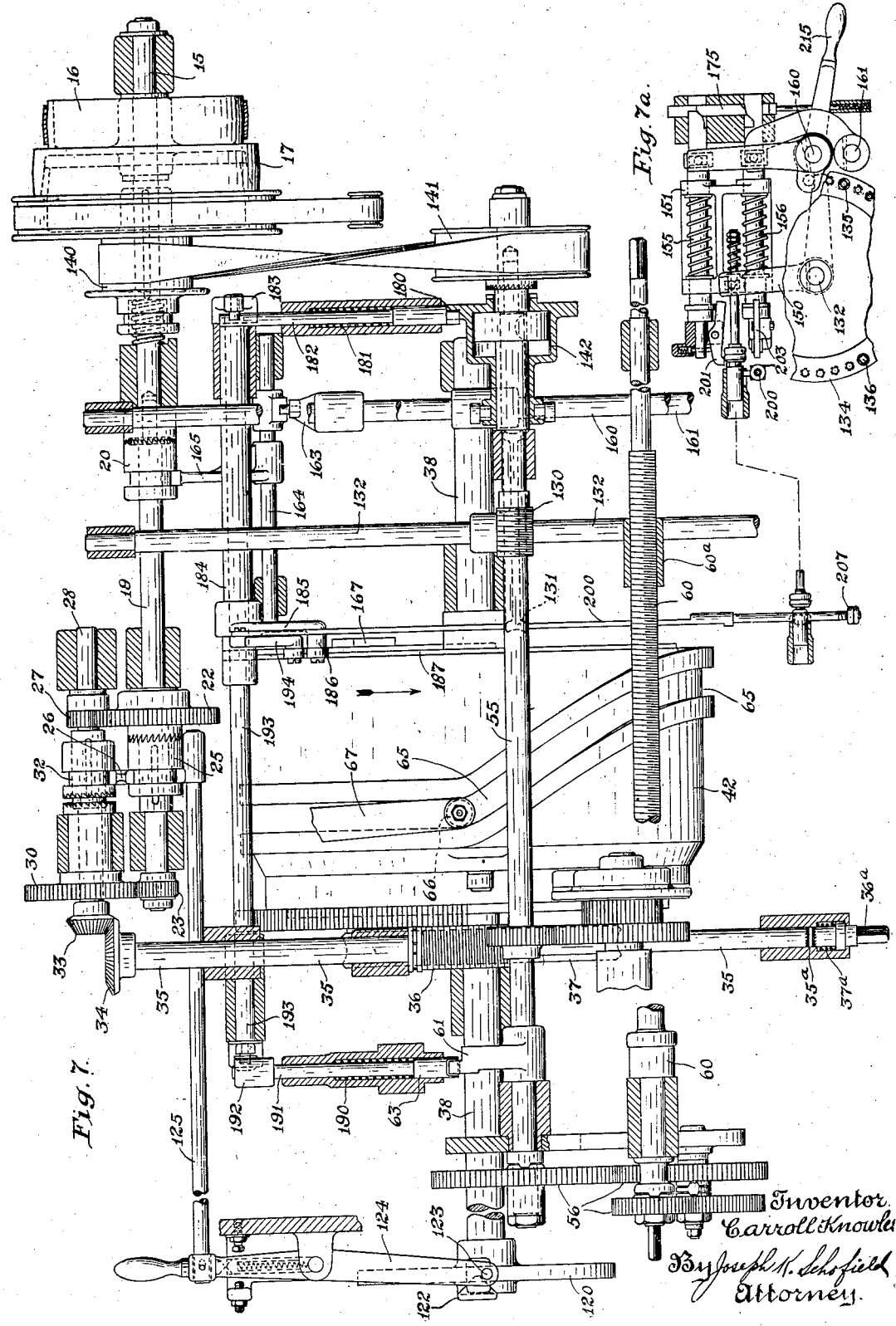
Fig. 7 shows a diagrammatical view of the complete operating mechanism of the machine.
Fig. 7a shows a diagrammatical view of a detail of the control mechanism.

The step by step movements of the table 11 in the indexing direction between which the wheels engage the cutter is derived from the following mechanism and is shown most clearly in Figs. 6 and 7. Extending along the rear of the base 10 is a main driving shaft 15 having at one end a main driving pulley 16 adjacent a friction clutch 17 so that when the clutch 17 is in the position shown in Fig. 6, the shaft 15 is caused to rotate. A toothed clutch member 18 fastened to shaft 15 connects the main driving shaft 15 with a shaft 19 mounted in alignment therewith when a companion clutch member is engaged therewith. Preferably the shaft 19 has an extension 19a extending within a depression formed in the end of driving shaft 15, this construction serving to maintain accurate alignment of shafts 15 and 19. To operate the clutch 17 to start the machine, it is only necessary to operate lever 17a by means of rod 18a extending along the front of the machine, Adjacent the clutch member 18 which, as above stated, is fastened to one end of the main driving shaft 15 is a corresponding clutch member 20 slidably mounted on the shaft 19. Clutch member 20 is provided with an annular groove 21 by means of which it may be moved into or out of engagement with the clutch member 18 by a controlling lever, movement of which is accomplished by control mechanism presently to be described. The shaft 19 is provided with gears 22 and 23 of different diameter mounted thereon between which is a clutch member 25 splined to shaft 19 and which may be moved in one direction to engage and rotate gear 22 on this shaft 19 so that it will drive a gear 27 fastened to a shaft 28 located just above and parallel to this shaft 19. The other gear 23 on the shaft 19 is keyed directly thereto and drives a gear 30 rotatably mounted on shaft 28 which, if connected to shaft 28 by means of clutch 32 splined on shaft 28 will drive this shaft 28 and also the bevel gear 33 mounted at one end. As the gears 22, 23 and their respective mating gears 27, 30 have different diameters two widely different speeds are provided for the upper shaft 28 and consequently for the bevel gear 33. To move the clutch members 25 and 32, they are connected by a double yoke member 26 which may be moved either to the right or left by a lever controlled by a main cam drum presently to be described. In either extreme position of the yoke member 26, one of the gears 22 or 23 on shaft 19 is in driving connection with the shaft 28 so that shaft 28, by operation of member 26 may be rotated at a high or low speed.

Bevel gear 33 through its mating bevel gear 34 fastened to shaft 35 drives shaft 35 which extends forwardly through the base 10 and which carries a worm 36 (see diagram Fig. 7). Worm 36 is in mesh with a worm wheel 37 fastened to a main cam shaft 38 located in the base 10 and extending the entire length of the machine. Rotation of cam shaft 38 controls the operation of the cutting wheels in timed relation to the indexing movements of the table 11 and the other mechanisms of the machine.

To operate the machine by hand during the preliminary adjustments of the mechanisms, the forward end of shaft 35 carries a series of serrations 35a adapted to connect with a corresponding set on a short squared shaft 36a. This is normally held out of engagement with shaft 35 but may readily be engaged by compression of spring 37a. With a suitable wrench on the forward end of short shaft 36a, the main cam shaft 38 may be slowly rotated.

Figure 5:
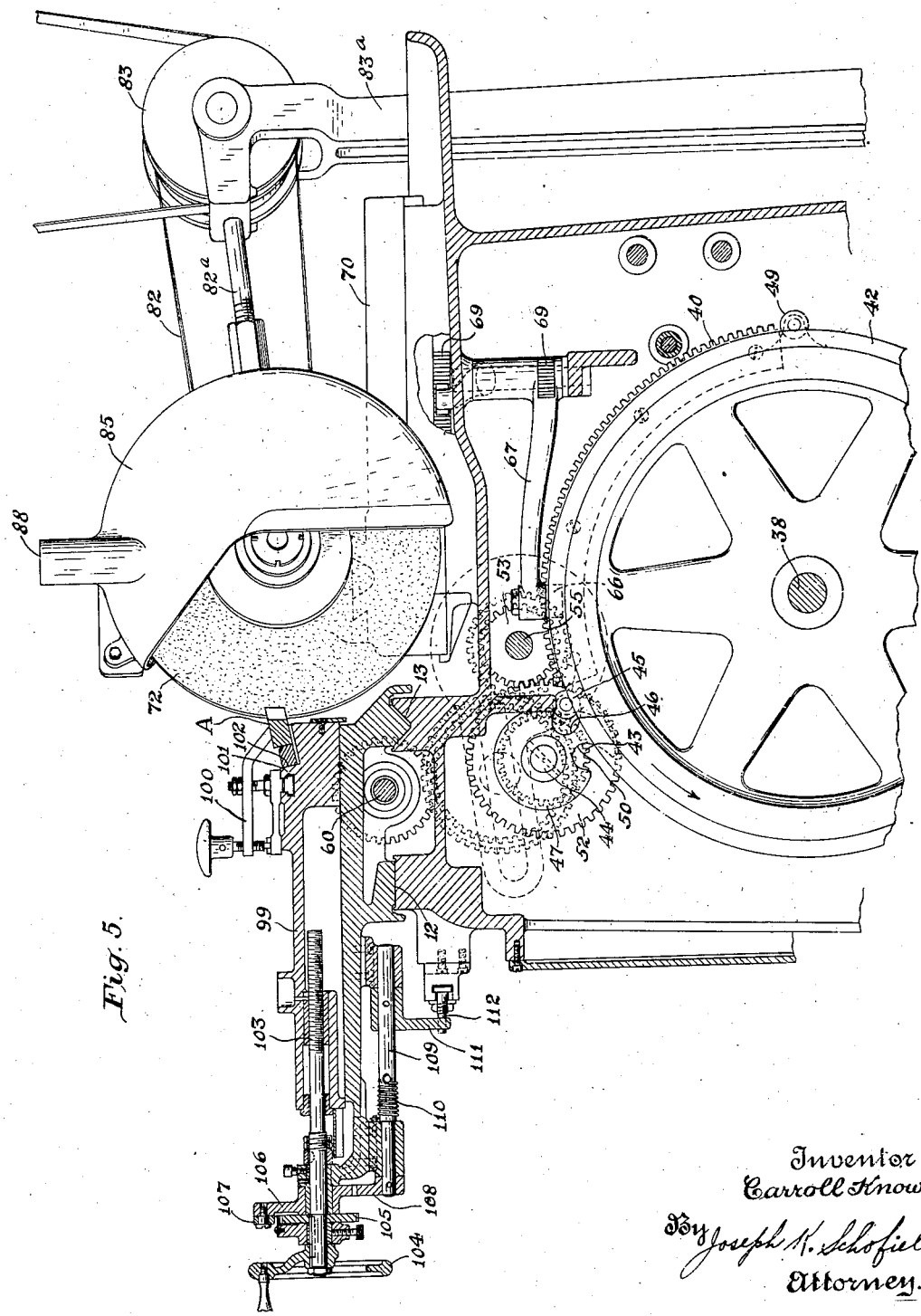
Fig. 5 shows a side elevation of the machine in section taken along line 5—5 of Fig. 3.

The mechanism provided for indexing or moving the table 11 predetermined distances along the base 10 to position the cutter for operation by the wheels comprises a segmental gear 40 fastened on the cam shaft 38 as shown clearly in Fig. 5. Preferably the segmental gear 40 is attached to and extends around a portion of the main cam drum 42 also mounted on shaft 38. This segmental gear 40 is adapted to mesh with a pinion 43 on short shaft 44 mounted adjacent the periphery of drum 42. Pinion 43 engages the segmental gear 40 during about one-fourth of the rotation of the main cam shaft 38 and sufficient for pinion to make at least two revolutions. In order to start the movement of the pinion 43 smoothly and slowly, I mount a roller 45 in alignment with and slightly in advance of the forward end of the segmental gear 40 which enters a slot 46 formed in a plate 47 fastened to shaft 44 adjacent to the driven pinion 43 so that during each revolution of the cam shaft 38 the roller 45 enters this slot 46 and rotates the pinion 43 a portion of a revolution until the segmental gear 40 is fully in mesh with pinion 43. In rear of the segmental gear 40 another roller 49 is provided which, after the driven pinion 43 and its shaft 44 have made an integer number of revolutions, enters a slot 50 in plate 47 oppositely disposed to the slot 46 previously mentioned, and thus gradually brings the pinion 43 and its shaft 44 to rest in a predetermined position. The position of the rollers 45 and 49 on the cam shaft 38 and also the length of the segmental gear 40 are so arranged that exactly two revolutions of the driven shaft 44 are produced during engagement of the pinion 43 with this gear 40. This takes place during each revolution of the main cam shaft 38 and drum 42. This mechanism forms a particular adaption of a Geneva gear combined with a segmental gear which serves to periodically rotate shaft 44, and stops rotation of shaft 44 when pinion 43 and gear 40 are out of mesh.

Figure 3:
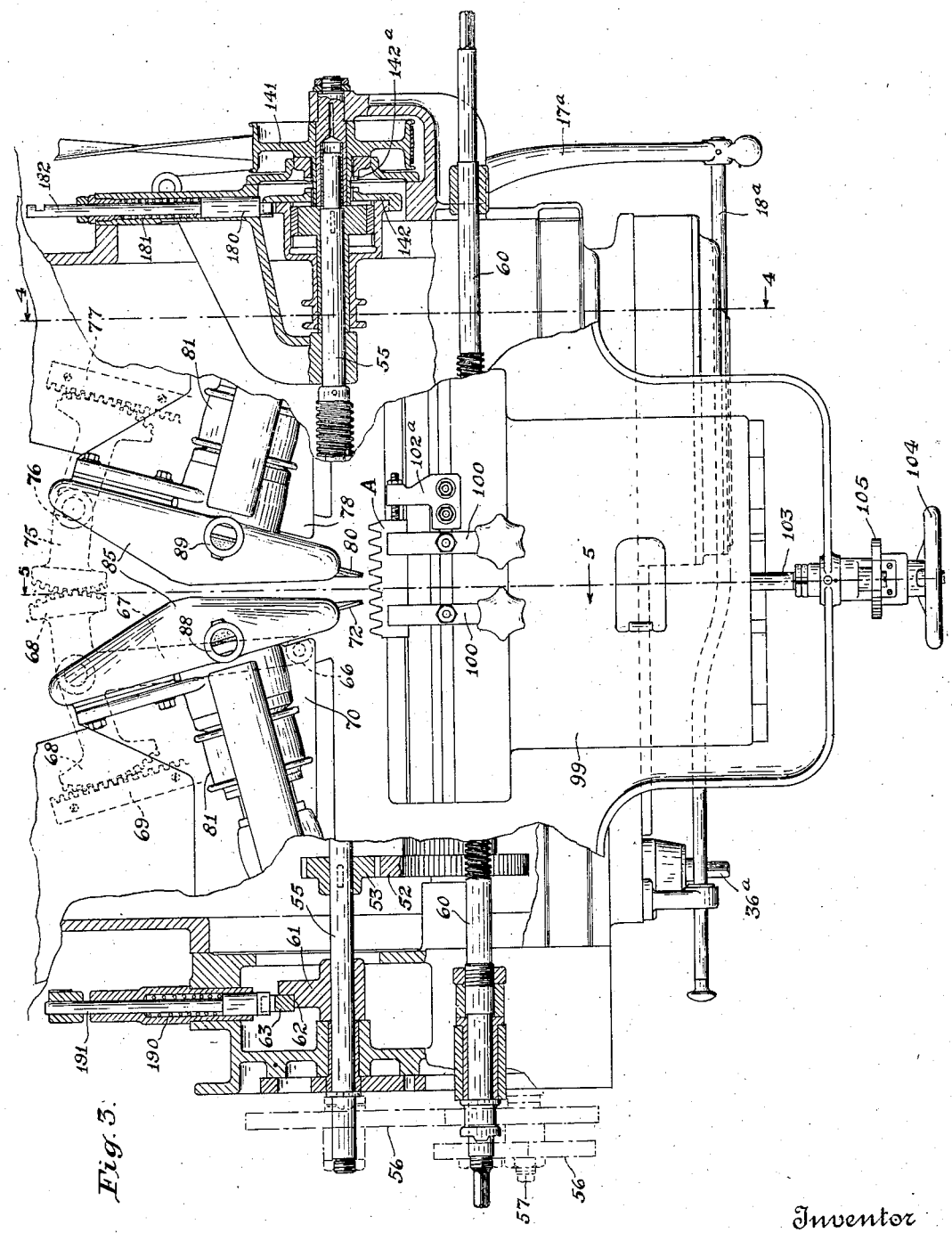
Fig. 3 shows a plan view of the machine on an enlarged scale, parts being broken away to more clearly show details of the construction.
Figure 4:
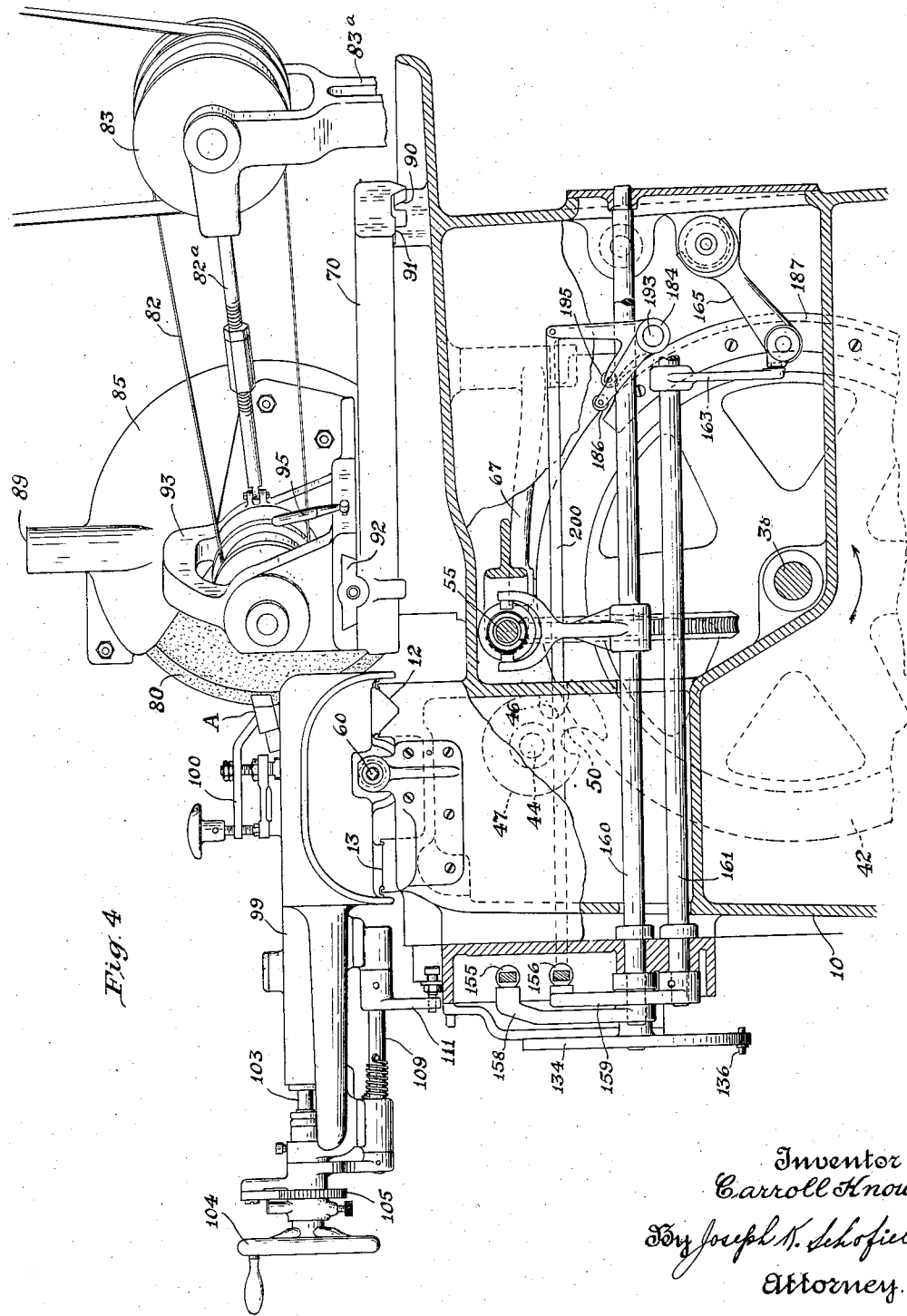
Fig. 4 shows a side elevation of the machine in section taken along line 4—4 of Fig. 3.

Also mounted on the short shaft 44 provided for the driven pinion 43 is a gear 52 meshing with a gear 53 on an intermediate driving shaft 55. This shaft 55 extends the entire length of the machine and is adapted to be connected by means of suitable change gearing 56 (see Fig. 2) to a lead screw 60 presently to be more fully described. Also on this shaft 55 is a plate or disk 61 (see Fig. 3) having a locking notch in its periphery 62 which is adapted to be engaged by a bolt 63 actuated by a suitable cam to accurately and securely lock the shaft 55 and therefore the lead screw 60 during the portion of the rotation of the cam shaft 38 when the lead screw 60 is stationary and the cutting wheels are in engagement with the cutter. The ratio of the driving gear for this shaft 55 is such that it makes an integer number, preferably 4, revolutions for each rotation of the cam shaft 38 and the segmental gear 40 so that the locking notch 62 in the plate 61 on this shaft 55 can be entered by the locking bolt 63 only after each periodic rotation of this shaft 55.

The lead screw 60, referred to above, is attached by means of the usual nut construction 60ª to the table 11 so that rotation of the lead screw in either direction traverses the table 11 to the right or left along the bed 10. By changing the gears 56 on the ends of shaft 55 and lead screw 60 any length of movement of the table 11 is possible while the shaft 55 rotates through the same number of revolutions. I preferably provide a stud shaft 57 carrying a compound gear to provide a greater range of movement to lead screw 60. This may or may not be used dependent upon the length of movement of table 11 which may be desired.

From the above it will be seen that I have provided mechanism for indexing the table 11 variable distances in a straight line, also that these movements occur periodically and while the main cam shaft makes about one fourth of a revolution. Also this movement takes place while the cutting wheels are out of engagement with the wheels.

To operate the cutting wheels toward or from the table between movements of table 11, I provide a cam slot 65 on the cam drum 42 mounted on the main cam shaft 38. This cam slot 65, as will be seen in Fig. 7 is provided with a helical portion and an annular or circumferential portion. While the annular portion of the cam 65 is engaged by a roller 66 connected to actuating lever 67 (see Fig. 5) there is no movement of the wheel slides, but, during its engagement with the helical or oblique portion of the slot, the wheel slides are given a reciprocatory movement.

The lever 67 having roller 66 engaging this slot 65 in the drum 42 is pivoted at its rear end and preferably has formed integrally therewith, sections or segments of a gear or gears 68. One of these segments 68 is in mesh with a rack 69. This rack 69 is attached rigidly to the lower surface of one of the wheel slides 70 so that oscillation of the actuating lever 67 about its pivot advances and retracts slide 70 on which is mounted one of the grinding wheels 72. Also meshing with the other segmental gear 68 on the actuating lever 67 is a segmental gear 75 forming an oscillating link which is pivoted as shown at 76. The other end of this pivoted link 75 is also formed as a segmental gear and engages a rack 77 similar to the one above described and mounted on the oppositely disposed wheel slide 78 on which cutting wheel 80 is mounted. From the above it will be seen that oscillation of link 67 by engagement of roller 66 with the cam groove 65 will simultaneously advance or return the wheel slides 70 and 78 along lines parallel to the rack 69 and 77.

Each of the wheels 72 and 80 is mounted on a carriage or head and is adapted to be rotated in suitable bearings by means of a pulley 81. Driving belts 82 for the wheel spindles pass over pulleys 83 mounted at the upper ends of arms 83a. These arms 83a may swing in accordance with movements of the wheels 72 and 80 and for that purpose are pivotally mounted in rear of the machine. Between the wheel slides 70 and 78 and the arms 83a are extension rods 82a by means of which the belts 82 may be maintained tight. A housing or covering 85 encloses the major portion of these wheels, these housings having surfaces 88 and 89 serving as positioning devices for dressing tools forming the subject matter of my copending application 479,030, filed on even date herewith. These surfaces 88 and 89 are at equal distances from the axes of the respective wheels above which they are mounted. Also on the wheel heads 70 and 78 are V's 93a and 95a positioned parallel with the axes of the wheels 72 and 80. These V's provide positioning means for dressing tools for use against the work engaging sides of the cutting wheels.

Each of the wheel heads 93 and 95 is adjustable with its carriage in a direction parallel to the direction of movement of the table 11, suitable clamping means being provided to lock the wheel heads in any adjusted position on their slides 70 and 78. As the construction of each of these wheel heads is similar a description of one will suffice for both.

On the upper surface of the base 10 in rear of table 11 are guideways 90 and 91 as shown in Fig. 6. But one pair of guideways is shown but it will be understood that a corresponding set of guideways are provided for the other wheel mounting. Guideways 90 and 91 are disposed obliquely to the guideways 12 and 13 so that the wheel 80 moves toward and away from the table 11 at an angle of about 75°. On the upper surface of slide 70 is a dove-tailed way 92 on which slides the wheel mounting 93. Guideway 92 extends parallel to the guideways 12 and 13 and therefore parallel to the direction of movement of the table 11. Both wheel mountings are provided with similar means for adjustment along ways 92 so that they may be adjusted directly toward or directly away from each other. In order to adjust the wheels accurately I provide a hand wheel 94 attached to a lead screw engaging the wheel head, and I also provide a clamping lever 95 to fasten it to its slide in any adjusted position.

Figure 1:
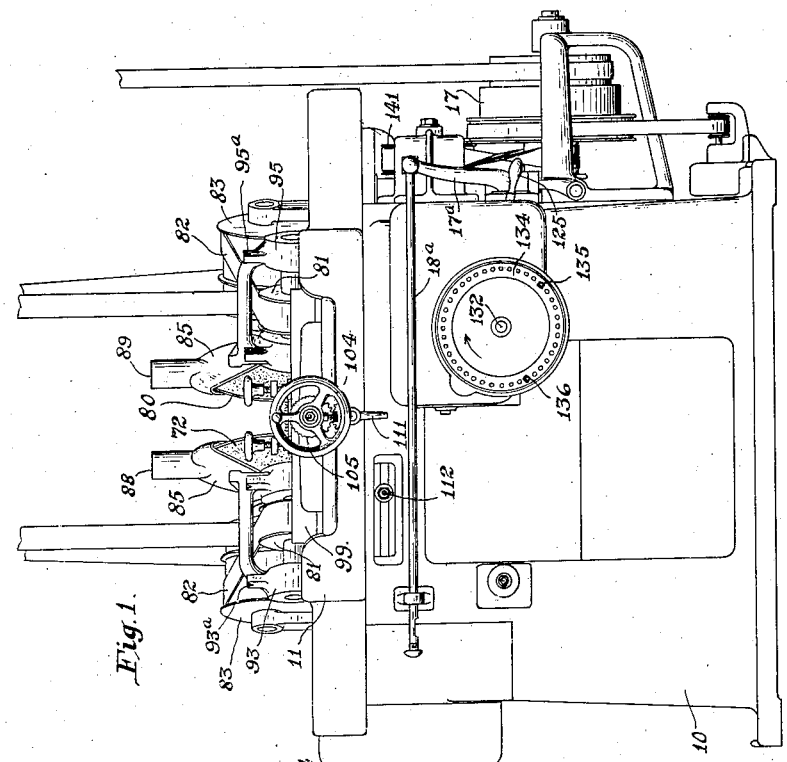
Figure 1 shows a front elevation of the complete machine.

The mechanism for supporting and adjusting the cutter to be ground comprises the following parts: On the upper surface of a slide 99 mounted on the table 11 is provided clamping means 100 for the cutter A which may be secured to the slide 99 by a bolt in T-slot 101. Preferably a guiding surface 102 on the slide 99 against which a cutter to be ground may be placed is provided, an adjustable stop 102a at one end being also provided so that similar sized cutters may be conveniently and quickly positioned. To feed the cutter so mounted toward the wheels, I provide the following mechanism: Cross slide 99 is adjustable toward or from the wheels on suitable guideways by rotation of a lead screw 103 and a hand wheel 104 as shown. The shaft on which the lead screw 103 is formed is provided with a ratchet wheel 105 fastened thereto. To actuate the ratchet wheel 105 to automatically advance the cutter toward the wheels 72 and 80 a member 106 loosely mounted on the lead screw 103 is provided which has a pawl 107 adapted to engage the teeth on the ratchet wheel 105. Member 106 has teeth on its lower edge engaging a segmental gear 108 fastened to an oscillating shaft 109 mounted in the slide 99 parallel to the lead screw 103. A spring 110 surrounding shaft 109 forces the shaft 109 in one direction. Also on shaft 109 is a projecting member 111 extending downward so that as the table is moved to the left as shown in Fig. 1, it comes into contact with finger 112 adjustably secured to the front of base 10. From this construction, it will be seen that at each return movement of the table 11 engagment of member 111 with finger 112 serves to oscillate shaft 109, and through ratchet wheel 105 will rotate the lead screw 103 through a small portion of a revolution which may be varied by the usual form of shield member thus advancing the cutter A on slide 99 slightly toward the wheels 72 and 80.

During operation of the machine, a slow rotation of the cam shaft 38 is required while the wheels 72 and 80 are in engagement with the work; and, during the rearward movement of the wheels away from the work during the indexing of the table and approach of the wheels to the work, a rapid rotation of the shaft 38 is permitted. In order to operate the shaft 38 at two different speeds during the different portions of the cycle of operation, a disk 120 is fastened to one end of the shaft 38. This is provided with dogs 121 and 122 which have oppositely disposed angular projections. These angular projections of the dogs 121 and 122 are adapted to be engaged by a pin or small roller 123 on the forward end of the lever 124 so that the lever 124 is thrown in one direction when in engagement with one of the dogs and in the opposite direction when in engagement with the other dog. Fastened to the lever 124 is a rod 125 attached to the clutch members 25 and 32 previously referred to by the yoke member 26. When the lever 124 is in one position, the clutch member 25 is in engagement with the gear 22 and rotates the cam shaft 38 at a relatively high speed and when this lever 124 is in its opposite position, the clutch member 32 is in engagement with the hub connected with gear 30 and rotates the cam shaft 38 at a relatively low speed.

As the machine forming the present invention is usually required to operate on cutters having a plurality of teeth, the number of these teeth being different in different cutters, it is necessary to provide means for indexing the table a plurality of times before returning it to its initial position. Also, the number of times the table is indexed before it is returned to it initial position must be variable to accommodate cutters having different numbers of teeth. To control this I mount a worm 130 on the driving shaft 55 for lead screw 60 (see Fig. 7). This worm 130 is in engagement with a worm wheel 131 fastened to a shaft 132 extending forwardly through the base 10 of the machine. As previously stated the shaft 55 makes a definite number of complete revolutions for each index movement of the table 11 so that with each movement of table 11 to advance the cutter A being ground the distance equal to one tooth the shaft 132 is rotated through a definite angle. On the forward end of this shaft 132 is an index plate 134 which is provided with two pins 135 and 136. Preferably pin 135 is not adjusted about the plate 134 but is used to reverse the table operating mechanism while pin 136 is adapted to be threaded into any one of the series of orifices provided in the index plate 134 to vary the number of indexing movements. The operation of this index plate will be described more in detail further on.

For reversing the movement of the table to return it to its initial position after one complete passage of the table in its indexing direction I provide the following mechanism: On the hub of the main driving clutch 17 I provide a pulley 140 for a belt which may pass over and drive pulley 141. Rotation of the pulley 141, when a clutch member 142 is engaged with clutch teeth 142ª formed on the hub of pulley 141, rotates the driving shaft 55 for the lead screw 60 in the reverse direction so that the table 11 is returned to initial position. This mechanism rotates the shaft 132 through worm 130 and worm wheel 131 in the reverse direction and also rotates the index plate 134 in the reverse direction to reposition the studs 135 and 136 to again operate the mechanism to again move the table in its index direction.

During indexing movements of the table 11, the pin 136 inserted in index plate 134 is slowly rotated one space at a time in the direction shown by the arrow in Fig. 1. By locating the pin 136 in any one of the different holes in plate 134, the table may make any desired number of index movements before pin 136 reaches a position directly over shaft 132 and operates the reversing mechanism for the table 11 to return it to its initial position.

As soon as pin 136 on the indexing dial 134 comes into contact with a lever 150 pivoted about shaft 132 on which index dial 134 is mounted, it forces a member 151 toward the right. Member 151 comprises a frame slidably mounted in rear of the index plate 134 operated to the left or right by lever 150 through a pin 152 on the member 151 engaging a slot on lever 150. This operates two rods 155 and 156 at predetermined times. Rods 155 and 156 are connected respectively to two levers 158 and 159. Oscillation of these levers oscillates shafts 160 and 161 to which clutch members 20 and 142 respectively are connected.

Referring first to the operation which takes place as soon as the last tooth on cutter A has been ground and the table 11 is about to be returned to its initial position, the pin 136 engages lever 150 which forces member 151 toward the right. This operates both levers 158 and 159 as soon as rods 155 and 156 move and oscillates shafts 160 and 161. Clutch member 21 is withdrawn by oscillation of shaft 161 from connection with the clutch member 18 thus stopping the rotation of the cam shaft 38 and the drum 42. The lever 163 actuated by oscillation of this shaft 161 through its sliding member 164 and yoke 165 forces a projection 166 on member 164 toward the right into engagement with a plate 167 mounted on one face of the cam drum 42. Preferably the mechanism is so adjusted that the clutch member 20 is opened slightly before the plate 167 comes into line with the sliding projection 166 so that the cam drum 42 can rotate slightly, and, when it takes up against the projection 166 it does not unduly jar the mechanism but serves to effectively stop the drum in exactly the proper position.

Oscillation of the upper lever 158 and the upper shaft 160 moves the clutch 142 into engagement with the clutch teeth on pulley 141 and, as this clutch member is directly attached to the shaft 55 it rotates it in the reverse direction relative to the indexing operation. This returns the table 11 to its initial position at which time the stud or pin 135 throws the lever 150 mounted in rear of the index plate 132 in the reverse direction thus moving member 151 to the left and, as soon as rods 155 and 156 move withdrawing clutch 142 out of engagement with the clutch teeth on pulley 141 and also allowing the clutch member 21 to engage its corresponding clutch member and again start rotation of the cam drum 42.

As shown clearly in Fig. 8, the rods 155 and 156 are not directly fastened to the member 151 but are so mounted that they may move relative to the member 151. Member 151 is moved in either direction against the pressure of springs 170 and 171 respectively and the rods 155 and 156 are moved by the expansive force of these springs. Movement of the member 151 in either direction by lever 150 urges the rods 155 and 156 in the corresponding direction through the medium of springs 170 and 171. By means of an interlocking plate 175, movement to the right of rod 155 is prevented until rod 156 has moved. Also with the rods in their opposite positions, movement to the left of rod 156 is prevented until rod 155 has moved. This necessitates disengagement of clutch 20 before clutch 142 closes and vice versa and avoids the possibility of both clutches for operating driving shaft 55 being simultaneously in engagement.

While the clutch 142 is out of engagement with clutch teeth on pulley 141, and during the time the shaft 55 is not rotating for the indexing movement, it is desirable to hold the shaft 55 positively locked in stationary position. For this purpose I provide a flange forming a part of the clutch 142 with a notch in which a pin 180 is adapted to normally rest. This is urged forwardly into engaging position by means of a spring 181 and is withdrawn from operative engagement with the clutch 142 by a rod 182 preferably formed integrally with pin 180 and engaged by a short lever 183 mounted at the end of a sleeve 184. At the opposite end of the sleeve a lever 185 is provided having at its outer or free end a roller 186 adapted to engage an arcuate projection 187 on the cam drum 42. Similarly the pin 63 previously mentioned is normally urged into engagement with the notch in plate 61 by means of a spring 190 and is withdrawn therefrom by a rod 191 formed integrally with pin 63 and attached to a lever 192 at one end of a rod 193. The opposite end of this rod is provided with a lever 194 having a roller 195 at its outer end. Both of the rollers 186 and 195 are in the same plane and are passed over by the same arcuate projection 187 on the cam drum 42. One of the rollers namely 186 as shown is slightly in front of the other so that on the forward indexing movement of the table 11 the pin 63 is first withdrawn. The roller 186 is in engagement through its operative parts with the pin 180 engaging the clutch 142 so that this pin 180 is removed from engagement with its slot immediately after the pin 63.

Forwardly extending from the lever 194 controlling the operation of pin 63 is a rod 200 which terminates in rear of the dial plate 134 of the index mechanism. Movement, therefore, of the lever 194 by means of the projecting plate 187 on the edge of the cam drum 42 reciprocates the rod forward or rearward. At the forward end of this rod is a nut or other projection 207 which engages a part of the index mechanism 203 to release rod 156 and through rod 156 moving also releasing rod 155.

The position of the arc shaped plate 187 on the cam drum 42 is such that it operates levers 185 and 194 after the cutting wheels 72 and 80 have completed their forward movement and have been returned to their rearmost position. The rod 200 is therefore not moved rearwardly until the cutting wheels 72 and 80 have moved rearwardly and the table is ready to be indexed. At the time levers 185 and 194 move rearward they disengage the pin 62 and pin 180 from their respective disks and permit rotation of the shaft 55 to rotate the lead screw 60. Cam plate 187 holds pins 62 and 180 out of engagement until the rotation of shaft 55 is completed after which they move forward into engagement with their disks under the pressure of springs 190 and 181. This locks the shaft 55 and lead screw 60 from further rotation. Further rotation of the cam drum 42 again advances the rotating wheels 72 and 80 into and out of engagement with the cutter.

This operation occurs each time the table 11 is indexed until it has made its next to last index movement at which time the stud or pin 136 is in position to engage a lever 150. As soon as the cutting wheels 72 and 80 have completed their next movement, pin 136 forces the lever 150 to the right on the last index movement thus compressing the springs 170 and 171. Simultaneously with movement to the right of lever 150 a rod 206 is forced to the right through spring 207 thus also forcing the forward end of rod 200 in the same direction, as shown in dotted lines in Fig. 9. As soon as the plate 187 again engages the lever 185 and the rod 200 is moved rearward, collars 207 on the forward end of the rod 200 contact with one end of a pawl 203 thus releasing this pawl 203 from engagement with a plate 204 mounted on rod 156. This permits the rod 156 to move toward the right thus oscillating the lever 159 and the shaft 161 to disengage the clutch 20 and stop further rotation of the cam drum 42.

Movement of the rod 156 to the right allows the interlock member 175 to drop thus permitting movement to the right of rod 155. This movement of rod 155 oscillates the lever 158 and the shaft 160 and throws the clutch 142 into engagement with the teeth on pulley 141 to rotate the driving shaft 55 in its reverse movement.

Movement of the rod 155 to the right is practically simultaneous with the movement of rod 156. As soon as rod 155 has completed its movement to the right a pawl 201 is engaged by disk 202 surrounding rod 155 and thus holds it in this position until the pawl 201 is moved out of engagement with disk 202 which does not occur until the rod 206 is returned to its initial position.

As soon as the reverse movement of the driving shaft 55 and lead screw 60 is complete the stud or pin 135 engages the right hand side of the lever 150 and forces it toward the left thus moving the member 151 to the left and again compressing springs 170 and 171. Movement to the left of the rods 155 and 156 is prevented, however, by reason of the engagement of plate 202 on rod 155 by the pawl 201. Also, as the rod 155 in its right position holds the interlock member 175 downward it prevents movement of the rod 156 to the left. As soon as the pawl 201 is engaged by the collar 210 on the rod 206, it moves the pawl 201 out of engagement with the plate 202 thus permitting the rod 155 to move to the left. This, however, does not occur until member 151 has completed its movement to the left and compressed springs 170 and 171. As soon as rod 155 has moved to the left the rod 156 moves in the same direction. This movement of the rods 155 and 156 oscillates the shafts 160 and 161 to the left thus throwing the clutch 142 out of engagement and throws the clutch member 21 into engagement with its driving member so that the cam drum 42 is again rotated.

To stop the operation of the indexing by hand, I provide a hand lever 215 which may conveniently be loosely mounted about shaft 160. This hand lever 215 is provided with a pin 216 which engages the end of an arm 217 on lever 150. By raising the lever 215, the lever 150 is moved to the right, which also moves the member 151 to the right and stops operation of the machine at the end of any of the index movements of the table 11 when the disengagement of pawl 203 permits movement of the rods 155 and 156 to the right and returns the table immediately to its initial position.

What I claim is:

1. A machine tool comprising in combination, a base, a work holding table movable therealong, a lead screw operatively connected to said table whereby rotation thereof is adapted to move said table, means to periodically rotate said lead screw to successively move said table a plurality of predetermined distances in a straight line, means to move said tool into and out of work engagement while said table is stationary, and means to vary the amount of movement of said table with each periodic movement.

2. A machine tool comprising in combination, a base, a table movable therealong, a lead screw operatively connected to said table whereby rotation thereof is adapted to move said table, automatic means to periodically rotate said lead screw, and automatic means to lock said lead screw while said lead screw is not being rotated.

3. A machine tool comprising in combination, a base, a table movable therealong, a lead screw operatively connected to said table whereby rotation thereof is adapted to successively move said table predetermined distances in the same direction in a straight line, a driving shaft for said lead screw, and means to periodically rotate said driving shaft.

4. A machine tool comprising in combination, a base, a table movable therealong, a tool adapted to engage work on said table, a lead screw operatively connected to said table whereby rotation thereof is adapted to successively move said table predetermined distances in the same direction in a straight line, a driving shaft for said lead screw, means to periodically rotate said driving shaft, and means to move said tool into and out of work engagement while said table is stationary.

5. A machine tool comprising in combination, a base, a table movable therealong, a lead screw operatively connected to said table whereby rotation thereof is adapted to move said table, a driving shaft for said lead screw, and means to periodically rotate said driving shaft a predetermined constant number of revolutions in the same direction.

6. A machine tool comprising in combination, a base, a table movable therealong, a tool adapted to engage work on said table, a lead screw operatively connected to said table whereby rotation thereof is adapted to move said table, a driving shaft for said lead screw, means to periodically rotate said driving shaft a predetermined constant number of revolutions in the same direction, and means to move said tool into and out of work engagement while said table is stationary.

7. A machine tool comprising in combination, a base, a table movable therealong, a lead screw operatively connected to said table whereby rotation thereof is adapted to successively move said table predetermined distances in the same direction on a straight line, a driving shaft for said lead screw, change gearing between said driving shaft and lead screw, and means to periodically rotate said driving shaft.

8. A machine tool comprising in combination, a base, a table movable therealong, a tool adapted to engage work on said table, a lead screw operatively connected to said table whereby rotation thereof is adapted to successively move said table predetermined distances in the same direction in a straight line, a driving shaft for said lead screw, change gearing between said driving shaft and lead screw, means to periodically rotate said driving shaft, and means to move said tool into and out of work engagement while said table is stationary.

9. A machine tool comprising in combination, a base, a table movable therealong, a lead screw operatively connected to said table whereby rotation thereof is adapted to move said table, a driving shaft for said lead screw, means to periodically rotate said driving shaft, and means engaging said driving shaft to lock said driving shaft and lead screw while said driving shaft is not being rotated.

10. A machine tool comprising in combination, a base, a table movable therealong, a lead screw operatively connected to said table whereby rotation thereof is adapted to move said table, a driving shaft for said lead screw, change gearing between said driving shaft and lead screw, means to periodically rotate said driving shaft and means to lock said driving shaft at the end of a predetermined number of revolutions.

11. A machine for forming gear cutters having a plurality of rack teeth, comprising in combination, a base, a table carrying a cutter to be formed, said table being movable along said base, a cutting tool adapted to engage said cutter, means to reciprocate said cutting tool obliquely relative to the direction of movement of said table, means to periodically index said table predetermined distances in the same direction and means to move said cutter toward and away from said cutting tool.

12. A machine for forming gear cutters having a plurality of rack teeth, comprising in combination, a base, a table carrying a cutter to be formed, said table being movable along said base, a cutting tool adapted to engage said cutter, means to reciprocate said cutting tool obliquely relative to the direction of movement of said table, automatic means to periodically index said table predetermined distances in the same direction between approaching movements of said cutting tool and means to feed said cutter toward said cutting tool.

13. A machine for forming gear cutters having a plurality of rack teeth, comprising in combination, a base, a table carrying a cutter to be formed, said table being movable along said base, a cutting tool adapted to engage said cutter, means to reciprocate said cutting tool obliquely relative to the direction of movement of said table, means to successively index said table in a straight line a predetermined number of times, means to return said table to its initial position, and means to feed said cutter toward said cutting tool.

14. A machine for forming gear cutters having a plurality of rack teeth, comprising in combination, a base, a table carrying a cutter to be formed, said table being movable along said base, a cutting tool adapted to engage said cutter, means to reciprocate said cutting tool obliquely relative to the direction of movement of said table, automatic means to index said table a plurality of times between approaching movements of said cutting tool, automatic means to return said table to its initial position, and means to feed said cutter toward said cutting tool.

15. A machine for forming gear cutters having a plurality of rack teeth, comprising in combination, a base, a table carrying a cutter to be formed, said table being movable along said base, a pair of symmetrically disposed cutting tools adapted to engage said cutter, means to reciprocate said cutting tools obliquely relative to the direction of movement of said table, means to index said table a plurality of times between approaching movements of said cutting tool and means to feed said cutter toward said cutting tools.

16. A machine tool comprising in combination, a base, a table movable therealong, a lead screw operatively connected to said table whereby rotation thereof is adapted to move said table, a constantly rotating member having gear teeth on a portion of its periphery, a pinion adapted to mesh with said gear teeth, and means connecting said pinion with said lead screw whereby said lead screw is rotated while said pinion is in mesh with said gear teeth.

17. A machine tool comprising in combination, a base, a table movable therealong, a lead screw operatively connected to said table whereby rotation thereof is adapted to move said table, a constantly rotating member having gear teeth on a portion of its periphery, a pinion adapted to mesh with said gear teeth, means connecting said pinion with said lead screw whereby said lead screw is rotated while said pinion is in mesh with said gear teeth, and means for locking said lead screw while said pinion is out of engagement with said gear teeth.

18. A machine tool comprising in combination, a base, a table movable therealong, a lead screw operatively connected to said table whereby rotation thereof is adapted to move said table, a constantly rotating member carrying a segmental gear on a portion of its periphery, a pinion adapted to mesh with said gear, means including change gears connecting said pinion with said lead screw whereby said lead screw may be rotated a predetermined number of revolutions while said pinion is in mesh with said gear.

19. A machine tool comprising in combination, a base, a table movable therealong, a lead screw operatively connected to said table whereby rotation thereof is adapted to move said table, a constantly rotating member carrying a segmental gear on a portion of its periphery, a pinion adapted to mesh with said gear, and means connecting said pinion with said lead screw whereby said lead screw is rotated while said pinion is in mesh with said gear to move said table a predetermined distance during each revolution of said rotating member.

20. A metal working machine comprising in combination, a base, a metal working tool thereon, a table, automatic means to move said table past said tool a predetermined distance, means to engage said tool with work mounted on said table, automatic means to alternately move said table said predetermined distance and engage said tool with said work, and means to return said table to its initial position.

21. A metal working machine comprising in combination, a base, a metal working tool thereon, a table, automatic means including a lead screw to move said table past said tool a predetermined distance, means to engage said tool with work mounted on said table, automatic means to alternately move said table said predetermined distance and engage said tool with said work, and automatic means operated by reversing the lead screw to return said table to its initial position.

22. A metal working machine comprising in combination, a base, a metal working tool thereon, a work carrying table, automatic means to move said table past said tool a predetermined distance, means permitting variations in said predetermined distance, means to engage said tool with work mounted on said table and automatic means to alternately move said table and engage said tool with said work, and means to return said table to its initial position.

23. A metal working machine comprising in combination, a base, a metal working tool thereon, a table, automatic means to successively move said table past said tool a predetermined distance in the same direction, means to engage said tool with work mounted on said table, automatic means to alternately move said table and engage said tool with said work, and automatic means to return said table to its initial position.

24. A metal working machine comprising in combination, a base, a metal working tool thereon, a table, automatic means to move said table past said tool a predetermined distance, means to engage said tool with work mounted on said table and automatic means to alternately move said table and engage said tool with said work a predetermined number of times, and means to return said table to its initial position after movement a predetermined number of times in the first direction.

25. A metal working machine comprising in combination, a base, a metal working tool thereon, a work carrying table thereon, means to periodically move said table a predetermined distance, means to vary said distance, means to engage said tool with the work between movements of said table, and means to return said table to its original position after a predetermined number of movements.

26. A metal working machine comprising in combination, a base, a metal working tool thereon, a work carrying table thereon, means to periodically move said table a plurality of predetermined distances, means to vary said distance and the number of times said table is moved, means to engage said tool with the work between movements of said table, and means to return said table to its original position after a predetermined number of movements.

27. A metal working machine comprising in combination, a base, a metal working tool thereon, a work carrying table thereon, means to periodically move said table a plurality of predetermined distances, means to vary said distance, means to engage said tool with the work between movements of said table and automatic means to return said table to its original position after a predetermined number of movements.

28. A metal working machine comprising in combination, a base, a metal working tool thereon, a work carrying table thereon, automatic means to move said table a plurality of predetermined distances, means permitting variations in said distances, means to engage said tool with the work between movements of said table and means to return said table to its original position after a predetermined number of movements.

29. A metal working machine comprising in combination, a base, a metal working tool thereon, a work carrying table thereon, automatic means to move said table a plurality of predetermined distances, means permitting variations in said distances and the number of times moved, means to engage said tool with the work between movements of said table and means to return said table to its original position after a predetermined but variable number of movements.

30. A machine for forming gear cutting tools of rack form, comprising in combination, a base, a pair of cutting tools disposed at an angle to each other and adapted to slide in directions corresponding with said angles, a table adapted to mount a cutter to be ground, means to move said cutting tools toward and from said cutter, automatic means to feed said table and cutter toward said tools, and means to periodically move said cutter predetermined successive distances past said tools.

31. A grinding machine for gear cutting tools of rack form comprising in combination, a base, a pair of grinding wheels disposed at an angle to each other and adapted to slide in directions corresponding with said angles, a table adapted to mount a cutter to be ground, cam actuated means to move said wheels toward and from said cutter, and automatic means to feed said cutter toward said wheels, and lead screw means to periodically move said table and cutter predetermined successive distances past said wheels.

32. A grinding machine for gear cutting tools of rack form comprising in combination, a base, a pair of grinding wheels independently adjustable and disposed at an angle to each other and adapted to slide respectively in directions corresponding with said angles, a table adapted to mount a cutter to be ground, means to move said wheels toward and from said cutter, means to periodically move said table and cutter predetermined distances past said wheels, and automatic means to feed said cutter toward said wheels after a plurality of movements of said table.

33. A grinding machine for gear cutting tools having teeth of rack form comprising in combination, a base, a pair of grinding wheels disposed at an angle to each other and adapted to slide in directions corresponding with said angles, means to laterally adjust said wheels independently of each other, a table adapted to mount a cutter to be ground, means to move said wheels toward and from said cutter, automatic means to feed said cutter toward said wheels, and means to periodically move said table and cutter past said wheels a distance corresponding to the pitch of the teeth on said cutter.

34. A machine for forming gear cutting tools of rack form comprising in combination, a base, a pair of cutting tools disposed at an angle to each other and adapted to slide in directions corresponding with said angles, a table adapted to mount a cutter to be ground, means to move said wheels toward and from said cutter, automatic means to feed said cutter toward said wheels, and automatic means to periodically move said table and cutter predetermined distances past said wheels a distance corresponding to the pitch of the teeth on said cutter.

35. Wheel operating mechanism for a grinding machine comprising in combination, a wheel slide, a rack thereon, an operating lever for said slide, and a gear segment carried by said lever and meshing with said rack whereby oscillation of said lever reciprocates said slide.

36. Wheel operating mechanism for a grinding machine comprising in combination, a pair of wheel slides, racks thereon, an operating lever for said slides, a gear segment carried by said lever meshing with one of said racks, another gear segment engaging said lever and operating said other slide whereby oscillation of said lever simultaneously reciprocates both of said slides.

37. A machine tool comprising in combination, a base, a main cam drum rotatably mounted therein, a table movable along said base, a lead screw operatively connected to said table, means on said cam drum to rotate said lead screw predetermined variable distances during a single rotation of said cam drum, and means on said cam drum to move cutting wheels into and out of engagement with work mounted on said table between successive movements of said lead screw.

38. A machine tool comprising in combination, a base, a main cam drum rotatably mounted therein, a table movable along said base, a lead screw operatively connected to said table, means on said cam drum to rotate said lead screw predetermined variable distances during a single rotation of said cam drum, means on said cam drum to move cutting wheels into and out of engagement with work mounted on said table between successive movements of said lead screw, and means to lock said lead screw when not being rotated.

39. A machine tool comprising in combination, a base, a main cam drum rotatably mounted therein, a table movable along said base, a lead screw operatively connected to said table, means on said cam drum to rotate said lead screw predetermined variable distances during a single rotation of said cam drum, means on said cam drum to move cutting wheels into and out of engagement with work mounted on said table between successive movements of said lead screw, means controlled by said cam drum to lock and unlock said lead screw during rotation of said cam drum, and means to rotate said cam drum at a high and a low speed.

40. A machine tool comprising in combination, a base, a main cam drum rotatably mounted therein, a table movable along said base, a lead screw operatively connected to said table, means on said cam drum to rotate said lead screw predetermined variable distances during the rotation of said cam drum, means on said cam drum to move cutting wheels into and out of engagement with work mounted on said table between successive movements of said table, and means to return the table to its initial position after a variable number of its movements.

41. A machine tool comprising in combination, a base, a main cam drum rotatably mounted therein, a table movable along said base, a lead screw operatively connected to said table, means on said cam drum to rotate said lead screw predetermined variable distances during the rotation of said cam drum, means on said cam drum to move cutting wheels into and out of engagement with work mounted on said table between successive movements of said table, means to return the table to its initial position after a variable number of its movements, and means to stop rotation of the cam drum during the return movement of the table.

42. A grinding machine comprising in combination, a base, a table adapted to hold a cutter to be ground and movable longitudinally along said base, a pair of cutting wheels mounted to move into and out of engagement with said cutter, and means to vary the speed at which said wheels move toward or from said cutter at any point in the stroke of said wheels toward or from said cutter.

43. A grinding machine comprising in combination, a base, a table adapted to hold a cutter to be ground and movable longitudinally along said base, a pair of cutting wheels mounted to move into and out of engagement with said cutter along lines oblique to the table movement and means to vary the speed at which said wheels move toward or from cutter at any point in the stroke of said wheels toward or from said cutter.

44. A grinding machine comprising in combination, a base, a table adapted to hold a cutter to be ground and movable longitudinally along said base, a pair of cutting wheels mounted to move into and out of engagement with said cutter along fixed oblique lines relative to the table movement, cam actuated means to move said wheels, and means to vary the speed of rotation of said cam actuated means for moving said wheels toward or from cutter at any point in the stroke of said wheels toward or from said cutter.

45. A grinding machine comprising in combination, a base, a table adapted to hold a cutter to be ground and movable longitudinally along said base, a pair of cutting wheels mounted to move into and out of engagement with said cutter, and means to vary the speed at which said wheels move toward or from cutter at any point in the stroke of said wheels toward or from said cutter so that while said wheels are in engagement with said cutter they move slowly and move rapidly while out of engagement with said cutter.

In testimony whereof, I hereto affix my signature.

CARROLL KNOWLES.